(12) United States Patent
Ross et al.

(10) Patent No.: US 9,441,103 B2
(45) Date of Patent: Sep. 13, 2016

(54) TIN-FREE CATALYSTS FOR CROSS-LINKED POLYETHYLENE PIPE AND WIRE

(71) Applicant: SACO AEI Polymers, Inc., Sheboygan, WI (US)

(72) Inventors: Christopher Ross, Sheboygan, WI (US); David Roberts, Sheboygan, WI (US); Anne M. Lawson, Akron, OH (US)

(73) Assignee: SACO AEI Polymers, Inc., Sheboygan, WI (US)

( * ) Notice: Subject to any disclaimer, the term of this patent is extended or adjusted under 35 U.S.C. 154(b) by 0 days.

(21) Appl. No.: 14/641,750

(22) Filed: Mar. 9, 2015

(65) Prior Publication Data

US 2015/0259523 A1    Sep. 17, 2015

Related U.S. Application Data

(60) Provisional application No. 61/951,055, filed on Mar. 11, 2014.

(51) Int. Cl.
  *C08L 51/06*    (2006.01)
(52) U.S. Cl.
  CPC .................................. *C08L 51/06* (2013.01)
(58) Field of Classification Search
  CPC .......................... C08L 51/06; C08L 2312/08
  USPC .................................. 525/69, 71, 74; 528/27
  See application file for complete search history.

(56) References Cited

U.S. PATENT DOCUMENTS

| 6,787,591 | B2* | 9/2004 | Koch ..................... C08K 5/005 524/100 |
| 8,252,749 | B2* | 8/2012 | Steinberg ................. A61K 8/02 514/20.7 |
| 2002/0169238 | A1 | 11/2002 | Caronia et al. |
| 2006/0258796 | A1* | 11/2006 | Boogh ..................... C08J 3/245 524/502 |
| 2007/0265364 | A1 | 11/2007 | Oner-Deliomanli et al. |
| 2008/0249246 | A1* | 10/2008 | Okada ................... C08F 290/04 525/221 |
| 2010/0016515 | A1 | 1/2010 | Chaudhary et al. |
| 2011/0027771 | A1* | 2/2011 | Deng ................... C12Q 1/6806 435/2 |
| 2011/0111153 | A1 | 5/2011 | Russell et al. |
| 2012/0091620 | A1 | 4/2012 | Mahabir |
| 2013/0216750 | A1* | 8/2013 | Li ......................... C08F 255/02 428/36.9 |

OTHER PUBLICATIONS

English Abstract of JP 05118473, 23 pages May 14, 1993, Japan.*
English Abstract of CN 103183168, 6 pages, Jul. 3, 2013, China.*
Sigma-Aldrich catalog for 4-Carboxy-TEMPO (CAS No. 37149-18-1), 1 page, Downloaded on Feb. 7, 2016.*
International Search Report and Written Opinion regarding PCT Application No. PCT/US2015/019398, mail date May 29, 2015, 13 pages.

* cited by examiner

*Primary Examiner* — Tae H Yoon
(74) *Attorney, Agent, or Firm* — Foley & Lardner LLP

(57) ABSTRACT

A composition includes an first anhydride-grafted polyethylene; and a cross-linking agent that includes a second anhydride; and a first material including minoxidil, melatonin; pentaerythritol tetrakis(3-(3,5-di-tert-butyl-4-hydroxyphenyl)propionate); or a (2,2,6,6-tetramethylpiperidin-1-yl)oxyl derivative, where the composition is a master batch configured to cross-link a silane-grafted polyethylene material; and the composition is tin-free.

17 Claims, No Drawings

TIN-FREE CATALYSTS FOR CROSS-LINKED POLYETHYLENE PIPE AND WIRE

CROSS-REFERENCE TO RELATED APPLICATIONS

This application claims the benefit of U.S. Provisional Patent Application No. 61/951,055, filed on Mar. 11, 2014, the entire disclosure of which is incorporated herein by reference for any and all purposes.

FIELD

The present technology generally relates to high-performance tin-free low-toxicity catalysts for curing cross-linked polyethylene.

BACKGROUND

Cross-linkable polyethylene (PEX) is typically produced commercially via either the Monosil Process or the Sioplas Process. In the Monosil process, a mixture of a vinylsilane, peroxide, cross-linking catalyst, and antioxidant is blended into a high-density or low-density polyethylene during an extrusion process. The extruded product is then moisture-cured in a water bath or steam sauna. The Monosil Process provides for large scale, cost-effective production of PEX. The cross-linking catalyst is typically an organotin-based catalyst such as dibutyltin dilaurate (DBTDL), or dioctyltin dilaurate (DOTDL).

In contrast, the Sioplas Process is a two-step process. In a first step, polyethylene is grafted with a mixture of a vinylsilane and a peroxide to produce a "cross-linkable" polyethylene. Separately, a cross-linking catalyst, an antioxidant, and polyethylene are mixed together in a single- or twin-screw extruder to form what is called the Master Batch. In the second step, the cross-linkable polyethylene and the Master Batch are then blended in a single- or twin screw extruder. The extrudate is then cooled with water thereby providing moisture for curing, or heat or low-pressure steam autoclaves are used to drive water into the material for curing. The catalyst of the Master Batch is typically also an organotin-based catalyst such as DBTDL. The Sioplas Process may be used in a wide variety of applications, utilize polyethylene from different sources, and requires a low capital investment.

Organotin compounds are known to be harmful to the environment, and they are toxic to humans. Organotin compounds may be extracted from PEX in water-contact applications, such as piping.

SUMMARY

In one aspect, a composition is provided, the composition including a first anhydride-grafted polyethylene and a cross-linking agent. The cross-linking agent includes a second anhydride; and a first material that is minoxidil, melatonin; pentaerythritol tetrakis(3-(3,5-di-tert-butyl-4-hydroxyphenyl)propionate); (2,2,6,6-tetramethylpiperidin-1-yl)oxyl (TEMPO); or a TEMPO derivative thereof derivative. The composition is a master batch configured to cross-link a silane-grafted polyethylene material and is tin-free. The first anhydride may be any anhydride material that grafts to polyethylene. In some embodiments, the first anhydride is maleic anhydride, succinic anhydride, or a mixture thereof. In some embodiments, the second anhydride is palmitic anhydride, stearic anhydride, alkyl or alkenyl succinic anhydride, citric anhydride, or a mixture of any two or more thereof. In some embodiments, the second anhydride is palmitic anhydride, citric anhydride, or a mixture of palmitic anhydride and citric anhydride. In some embodiments, the composition further includes boric acid stearate. In other embodiments, the composition further includes borosilicate glass, silica, or a zeolite. In some embodiments, the first material includes melatonin. In another embodiments, the first material includes pentaerythritol tetrakis(3-(3,5-di-tert-butyl-4-hydroxyphenyl) propionate). In other embodiments, the first material includes 4-carboxy-2,2,6,6-tetramethylpiperidine-1-oxyl. In some embodiments, the composition includes from about 0.01 wt % to about 40 wt % of the first anhydride-grafted polyethylene. In some embodiments, the composition includes from about 0.01 wt % to about 30 wt % palmitic anhydride, stearic anhydride, alkyl or alkenyl succinic anhydride, citric anhydride, or a mixture of or any two or more thereof. In some embodiments, the composition includes from about 0.01 wt % to about 30 wt % palmitic anhydride, citric anhydride, or a mixture of palmitic and citric anhydrides. In some embodiments, the composition includes from about 0.01 wt % to about 30 wt % of the first material. In some embodiments, the composition further includes one or more antioxidants.

In another aspect, a tin-free, cross-linked polyethylene including a silane-grafted polyethylene and the composition, above, is provided. In some embodiments, the silane-grafted polyethylene includes a vinyltrimethoxysilane-grafted polyethylene, a vinyltriethoxysilane-grafted polyethylene, or a mixture of a vinyltrimethoxysilane-grafted polyethylene and a vinyltriethoxysilane-grafted polyethylene. In some embodiments, the first anhydride is maleic anhydride. In some embodiments, the second anhydride is palmitic anhydride, stearic anhydride, alkyl or alkenyl succinic anhydride, citric anhydride, or a mixture of any two or more thereof. In some embodiments, the second anhydride is palmitic anhydride, citric anhydride, or a mixture of palmitic anhydride and citric anhydride. In some embodiments, the tin-free cross-linked polyethylene includes from about 1.5 wt % to about 3 wt % of the first anhydride-grafted polyethylene. In some embodiments, the tin-free cross-linked polyethylene includes from about 1.5 wt % to about 3 wt % palmitic anhydride, stearic anhydride, alkyl or alkenyl succinic anhydride, citric anhydride, or a mixture of any two or more thereof. In some embodiments, the tin-free cross-linked polyethylene includes from about 1.5 wt % to about 3 wt % palmitic anhydride, citric anhydride, or a mixture of palmitic and citric anhydride.

In another aspect, a process is provided, which includes extruding a first anhydride-grafted polyethylene and a cross-linking agent to form a master batch; extruding a silane-grafted polyethylene with the master batch to form a cross-linkable blend; and exposing the cross-linkable blend to water to form a cross-linked polyethylene. In some embodiments, the cross-linking agent includes a second anhydride and a first material selected from the group consisting of minoxidil, melatonin; pentaerythritol tetrakis(3-(3,5-di-tert-butyl-4-hydroxyphenyl)propionate); and a (2,2,6,6-tetramethylpiperidin-1-yl)oxyl derivative. In some embodiments, the cross-linked polyethylene is tin-free. In some embodiments, the master batch includes from about 0.01 wt % to about 10 wt % first anhydride-grafted polyethylene. In some embodiments, the master batch includes from about 0.01 wt % to about 10 wt % of the second anhydride. In some embodiments, the process further includes grafting polyethylene with a silane to form the silane-grafted polyethylene. In some embodiments, the master batch includes from about 0.01 wt % to about 10 wt % of the first material. In some embodiments, the first anhydride-grafted polyethylene is a maleic anhydride-grafted polyethylene. In some embodiments, the master batch includes from about 1.5 wt % to about 3 wt % of the first anhydride-grafted polyethylene. In some embodiments, the master batch comprises from about 1.5 wt % to about 3 wt % of the second anhydride. In some embodiments, the master batch comprises from about 1.5 wt % to about 3 wt % of the first material.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "alkyl or alkenyl succinic anhydride" refers to a succinic anhydride having an alkyl or alkenyl moiety. In some embodiments the alkyl or alkenyl moiety is a $C_{16}$-$C_{18}$ alkyl group or a $C_{16}$-$C_{18}$ alkenyl group. Alkyl groups are saturated hydrocarbon chains that may be substituted. Alkenyl groups are unsaturated hydrocarbon chains that may have one or more sites of unsaturation.

Provided herein are compositions, processes of making the compositions, and articles employing the compositions. The compositions include a cross-linked, silane-grafted polyethylene that is cross-linked without the use of tin-based catalysts. The materials that are used for the cross-linking are either non-toxic or of substantially lower toxicity than tin-based catalysts which represent the industry standard for such polymerizations and cross-linking reactions. The processes of preparing the compositions are based upon the Sioplas Process as described above. In the present case, a polyethylene is grafted with a vinylsilane and a peroxide to produce a cross-linkable polyethylene. Separately, a non-tin-based cross-linking catalyst, an anti-oxidant, and polyethylene are mixed together in a single- or twin-screw extruder to form what is called the Master Batch. In the second step, the cross-linkable polyethylene is then blended with the Master Batch and the material is then cured to form the cross-linked polyethylene. Such materials will be suitable replacement materials for the traditionally tin catalyzed PEX, especially where the PEX is in contact with ingetable materials. For example, piping is one such application where the PEX without the tin-based catalyst is highly desirable. The materials may also be used in rotomolded articles and wood-plastic composite materials. Illustrative examples include, but are not limited to, canoes, catamarans, kayaks, surfboards, bodyboards, sailboats, paddleboards, and the like.

In one aspect, a composition is provided, the composition including a first anhydride-grafted polyethylene and a cross-linking agent. The polyethylene may be a high or low density polyethylene, and can include co-polymers of ethylene as well as homopolymers of ethylene. The composition may be used as the Master Batch with a cross-linkable polyethylene. Illustrative first anhydrides include, but are not limited to, maleic anhydride, succinic anhydride, phthalic anhydride, itaconic anhydride, glutaric anhydride, and adipic anhydride. In some embodiments, the first anhydride is maleic anhydride or a derivative of maleic anhydride such as maleic acid and/or salts thereof, maleic acid diesters, maleic acid monoesters, or mixtures of any two or more of these. In some embodiments, the first anhydride is maleic anhydride. The amount of first anhydride-grafted polyethylene in the composition may be from about 0.001 wt % to about 50 wt %. In some embodiments, the composition includes from about 0.01 wt % to about 40 wt % of the first anhydride-grafted polyethylene. In other embodiments, the composition includes from about 0.05 wt % to about 30 wt % of the first anhydride-grafted polyethylene. In further embodiments, the composition includes from about 0.1 wt % to about 20 wt % of the first anhydride-grafted polyethylene. In some embodiments, the composition includes from about 1 wt % to about 10 wt % of the first anhydride-grafted polyethylene.

The cross-linking agent includes a second anhydride and a first material. The first material is a free radical catalyst material that initiates the cure of cross-linkable polyethylene materials. Suitable first materials include, but are not limited to, of minoxidil, melatonin; pentaerythritol tetrakis(3-(3,5-di-tert-butyl-4-hydroxyphenyl)propionate); (2,2,6,6-tetramethylpiperidin-1-yl)oxyl ("TEMPO"), a derivative of TEMPO, or a mixture of any two or more thereof, or any other stable nitroxy radical producing compounds. In some embodiments, the first material includes minoxidil. In other embodiments, the first material includes melatonin. In yet another embodiments, the first material includes pentaerythritol tetrakis(3-(3,5-di-tert-butyl-4-hydroxyphenyl) propionate). In other embodiments, the first material includes 4-carboxy-2,2,6,6-tetramethylpiperidine-1-oxyl (TEMPO), or a derivative thereof. The amount of first material in the composition may be from about 0.001 wt % to about 40 wt %. In some embodiments, the composition includes from about 0.01 wt % to about 30 wt % of the first material. In other embodiments, the composition includes from about 0.05 wt % to about 20 wt % of the first material. In further embodiments, the composition includes from about 0.1 wt % to about 10 wt % of the first material.

Suitable anhydrides useful as the second anhydride include, but are not limited to, $C_2$-$C_{30}$ alkyl or alkenyl anhydrides. Illustrative examples include, but are not limited to, palmitic anhydride, caprylic anhydride, myristic anhydride, stearic anhydride, arachidic anhydride, capric anhydride, behenic anhydride, lignoceric anhydride, cerotic anhydride, lauryl anhydride, citric anhydride, acetic anhydride, and lactic anhydride or a mixture of any two or more thereof. In some embodiments, the second anhydride is palmitic anhydride, stearic anhydride, alkyl or alkenyl succinic anhydride, citric anhydride, or a mixture of any two or more thereof. In some embodiments, the second anhydride is palmitic anhydride, citric anhydride, or a mixture of palmitic anhydride and citric anhydride.

The amount of the second anhydride in the composition may be from about 0.001 wt % to about 40 wt %. In some embodiments, the composition includes from about 0.01 wt % to about 30 wt % of the second anhydride. In other embodiments, the composition includes from about 0.05 wt % to about 20 wt % of the second anhydride. In further embodiments, the composition includes from about 0.1 wt % to about 10 wt % of the second anhydride. In some embodiments, the composition includes from about 0.01 wt % to about 30 wt % palmitic anhydride, stearic anhydride, alkyl or alkenyl succinic anhydride, citric anhydride, or a mixture of any two or more thereof. In some embodiments, the composition includes from about 0.01 wt % to about 30 wt % palmitic anhydride, citric anhydride, or a mixture of palmitic and citric anhydrides.

The composition may include other additives such as, for example, curing agents, antioxidants, processing aids, stabilizers, pigments, lubricants, flow control agents, etc. For example, the composition may include boric acid stearate, silica, and/or a zeolite. The composition may also include one or more antioxidants. Illustrative antioxidants include, but are not limited to, Irganox® 1010 and Irgafos® 168. Illustrative additives that may be incorporated in the compositions include, but are not limited to, arginine, 5-HTP, glutathione, proline, lysine, cystine, aspargine, glutamine, nicotinamide adenine dinucleotide phosphate (NADP), Coenzyme Q10 (Ubiquinone), Vitamin E, Vitamin C, carotenoids or a mixture of any two or more thereof. The amount of additives is normally within the range of about 0 wt % to about 5% wt %. In some embodiments, the composition includes from about 0.01 wt % to about 4 wt % of the additives. In further embodiments, the composition includes from about 0.05 wt % to about 3 wt % of the additives. In some embodiments, the composition includes from about 0.1 wt % to about 2 wt % of the additives.

In another aspect, a tin-free, cross-linked polyethylene including a silane-grafted polyethylene and the composition, above, is provided. The silane-grafted polyethylene may include a vinyltrimethoxysilane-grafted polyethylene, a grafted polyethylene-polydimethylsiloxane-siloxy copolymer, a vinyltriethoxysilane-grafted polyethylene, or a mixture of any two or more such silane-graphed polyethylenes.

The compositions included in the tin-free, cross-linked polyethylene include a first anhydride-grafted polyethylene and a cross-linking agent. The cross-linking agent includes a second anhydride and a first material. Suitable first materials are described above. In some embodiments, the first materials are selected from the group consisting of a first material selected from the group consisting of minoxidil, melatonin; pentaerythritol tetrakis(3-(3,5-di-tert-butyl-4-hydroxyphenyl)propionate); and a (2,2,6,6-tetramethylpiperidin-1-yl)oxyl derivative. In some embodiments, the composition is a master batch configured to cross-link a silane-grafted polyethylene material. Suitable first anhydrides are described above. In some embodiments, the first anhydride is maleic anhydride. In some embodiments, the tin-free cross-linked polyethylene includes from about 1.5 wt % to about 3 wt % of the first anhydride-grafted polyethylene.

Suitable anhydrides useful as the second anhydride include, but are not limited to, $C_2$-$C_{30}$ alkyl or alkenyl anhydrides. Illustrative examples include, but are not limited to, palmitic anhydride, caprylic anhydride, myristic anhydride, stearic anhydride, arachidic anhydride, capric anhydride, behenic anhydride, lignoceric anhydride, alkyl or alkenyl succinic anhydrides, cerotic anhydride, lauryl anhydride, citric anhydride, acetic anhydride, and lactic anhydride or a mixture of any two or more thereof. In some embodiments, the second anhydride is palmitic anhydride, stearic anhydride, alkyl or alkenyl succinic anhydride, citric anhydride, or a mixture of any two or more thereof. In some embodiments, the second anhydride is palmitic anhydride, citric anhydride, or a mixture of palmitic anhydride and citric anhydride. In some embodiments, the tin-free cross-linked polyethylene includes from about 0.01 wt % to about 10 wt % of the second anhydride. In other embodiments, the tin-free cross-linked polyethylene includes from about 0.1 wt % to about 8 wt % of the second anhydride. In further embodiments, the tin-free cross-linked polyethylene includes from about 1 wt % to about 5 wt % of the second anhydride. In some embodiments, the tin-free cross-linked polyethylene includes from about 1.5 wt % to about 3 wt % palmitic anhydride, stearic anhydride, alkyl or alkenyl succinic anhydride, citric anhydride, or a mixture of any two or more thereof. In some embodiments, the tin-free cross-linked polyethylene includes from about 1.5 wt % to about 3 wt % palmitic anhydride, citric anhydride, or a mixture of palmitic and citric anhydride.

In another aspect, a process is provided, which includes extruding a first anhydride-grafted polyethylene and a cross-linking agent to form a Master Batch, extruding a silane-grafted polyethylene with the Master Batch to form a cross-linkable blend, and exposing the cross-linkable blend to water to form a cross-linked polyethylene. In some embodiments, the cross-linked polyethylene is tin-free. The cross-linking agent includes a second anhydride and a first material. Suitable types and amounts of first materials, first anhydrides and second anhydrides are described above. In some embodiments, the first materials are selected from the group consisting of a first material selected from the group consisting of minoxidil, melatonin; pentaerythritol tetrakis (3-(3,5-di-tert-butyl-4-hydroxyphenyl)propionate); and a (2,2,6,6-tetramethylpiperidin-1-yl)oxyl derivative. In some embodiments of the process, the Master Batch includes from about 0.01 wt % to about 10 wt % first anhydride-grafted polyethylene. In some embodiments of the process, the Master Batch comprises from about 0.01 wt % to about 10 wt % of the second anhydride. In some embodiments of the process, the Master Batch comprises from about 0.01 wt % to about 10 wt % of the first material. In some embodiments, the process further includes grafting polyethylene with a silane to form the silane-grafted polyethylene. In some embodiments of the process, the first anhydride-grafted polyethylene is a maleic anhydride-grafted polyethylene. In some embodiments of the process, the master batch comprises from about 1.5 wt % to about 3 wt % of the first anhydride-grafted polyethylene. In some embodiments of the process, the master batch comprises from about 1.5 wt % to about 3 wt % of the second anhydride. In some embodiments of the process, the master batch comprises from about 1.5 wt % to about 3 wt % of the first material.

In one aspect, a composition which includes a Master Batch configured to cross-link a silane-grafted polyethylene material is provided. In some embodiments, the composition is tin-free. In some embodiments, the Master Batch may include minoxidil, melatonin, Irganox® 1010, and/or a TEMPO derivative.

As used herein, minoxidil is 6-piperidin-1-yl-pyrimidine-2,4-diamine-3-oxide. The structure of the compound is:

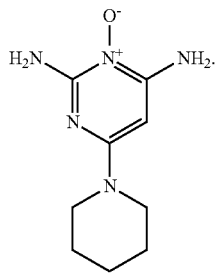 [SMILES: Nc1cc(N2CCCCC2)nc(N)[n+]1[O-]]

As used herein, melatonin is a trivial name for N-acetyl-5-methoxytryptamine, the structure of which is represented by:

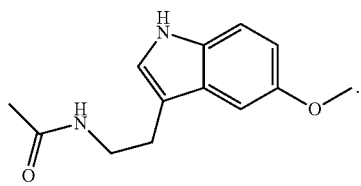 [SMILES: COc1ccc2[nH]cc(CCNC(C)=O)c2c1]

As used herein, Irganox® 1010 is the tradename for pentaerythritol tetrakis(3-(3,5-di-tert-butyl-4-hydroxyphenyl)propionate), the structure of which is represented by:

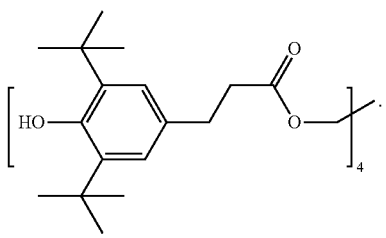

However, it is noted that when using Irganox 1010, there is a risk of extraction of p-tertbutylphenol by water in PEX pipe applications. Accordingly, the end use of the PEX should be considered when selecting the cross-linking catalyst materials for use in cross-linking of the polyethylene.

As used herein, TEMPO is an abbreviation of compounds based on (2,2,6,6-tetramethylpiperidin-1-yl)oxyl. The structure of this group is:

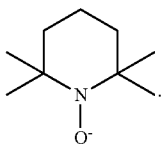

Derivatives of TEMPO include, but are not limited to, 4-acetamido-TEMPO; 4-acetamido-2,2,6,6-tetramethylpiperidine 1-oxyl; 4-amino-TEMPO; 2-azaadamantane-N-oxyl; 4-(2-bromoacetamido)-TEMPO; 4-carboxy-TEMPO; 4-cyano-TEMPO; 4-hydroxy-TEMPO; 4-hydroxy-TEMPO benzoate; 4-(2-iodoacetamido)-TEMPO; 4-isothiocyanato-TEMPO; 4-maleimido-TEMPO; 4-methoxy-TEMPO; 4-oxo-TEMPO; 4-phosphonooxy-TEMPO hydrate; and TEMPO methacrylate.

Other cross-linking additives may be included in the master batch. For example, boric acid, or boric acid stearate may be added to increase the cure rate. Materials such as polyethylene-polydimethylsiloxane copolymer may be used as a process aid and for UV protection.

Several of the above materials have been used individually in cross linkable polyethylene (PEX) preparations in the past. However, when used individually, such catalyst materials required a high concentration to be effective, they were too readily extracted from the PEX into the drinking water flowing through a pipe formed from the PEX, or the cure rate of the PEX was unacceptably slow. However, it was surprisingly found that in the described combinations, the catalytic materials cure the PEX pipe at an acceptable rate that is the same as, or comparable to state-of-the-art tin catalyst system rates, and at a significantly lower concentrations than were used for the materials individually. It has also been found that the non-tin based catalytic materials are difficult to extract with water from the PEX, and where the catalytic material is extracted, it is either non-toxic or has a significantly lower toxicity than traditional tin-based catalysts.

For the compositions described above, the catalytic materials have been found to cure cross linkable polyethylene at approximately the same rate under the same conditions as the tin-based catalyst. For example, the above catalysts achieve a 70% cure of the polyethylene in less than 20 hours when exposed to water at 90° C. The cure is determined according to ASTM Standard D2765.

The compositions of the present technology can be utilized in manufacturing various articles including, but not limited to, pipes, wires, joints, watercraft, automotive ducts and housings, power cable insulations, and the like. The present technology provides tin-free catalytic solutions to prepare cross linkable polyethylene compositions, which perform as well as, or even better than the state-of-the-art tin catalysts. Moreover the byproducts of the present process are non-toxic and/or non-extractable. Therefore, the composition is of particular value for utilization in manufacturing articles where low toxicity is of prime consequence, e.g., cross-linked polyethylene pipe for the distribution of potable water.

The present invention, thus generally described, will be understood more readily by reference to the following examples, which are provided by way of illustration and are not intended to be limiting of the present invention.

EXAMPLES

Example 1

All samples mixed in 50 gram batches on the mixing bowl at 160° C. Samples cured at 90° C. for 24 hours in 18.2 Ohm water. The results are grouped in Table 1, with the corresponding alternative catalysts for the cure, with the cure tested according to ASTM Standard D2765. In each sample of Example 1, a vinyltrimethoxysilane-grafted HDPE, prepared by the siloplast method, is cured, using a masterbatch mixture containing polyethylene and the components listed. Each masterbatch contains the amount of catalyst noted. For example, the masterbatch in sample 1B contains 1.8 wt % 4-carboxyTEMPO and 1.8 wt % palmitic anhydride. For the control in each sample set, it was prepared with 0.18 wt % dioctyltindilaurate in polyethylene. In each sample set, the control was used as a standard by which the non-tin-containing materials are compared, under the same conditions. Each sample contained a 95:5 mixture of the vinyltrimethoxysilane-grafted HDPE:masterbatch, based on weight. The examples show that similar cure times are obtained for the non-toxic formulations as compared to the tin-containing formulations. For some examples, film thickness of the cure study samples were recorded for later samples to ensure accuracy of the results.

TABLE 1

Gel times at different hour time points for various compositions for Siloplast prepared silane-grafted HDPE.

| Sample No. | Masterbatch* | % Gel at 8 hours | % Gel at 12 hours | % Gel at 17 hours | % Gel at 24 hours |
|---|---|---|---|---|---|
| 1C | Control | 74.74 | 74.99 | 76.95 | 79.62 |
| 1A | 1.8% 4CT; 1.8% Arginine 3.6% PA | 65.67 | 74.61 | 76.13 | 78.77 |
| 1B | 1.8% 4CT; 1.8% PA | 72.44 | 70.50 | 77.56 | 79.38 |
| 2C | Control | 73.46 | 74.39 | 74.89 | 76.08 |
| 2A | 1.8% Mino; 1.8% PA | 66.20 | 71.38 | 72.00 | 74.71 |
| 2B | 1.8% Irg; 1.8% PA | 58.86 | 65.72 | 70.08 | 72.40 |
| 2D | 1.8% Mino; 2.7% PA | 69.29 | 72.23 | 74.65 | 76.64 |
| 2E | 2.7% Irg; 1.8% PA | 58.07 | 65.74 | 69.18 | 72.48 |
| 3C | Control | 74.74 | 74.99 | 76.96 | 79.62 |
| 3A | 3.6% 4CT; 3.6% PA | 72.44 | 70.05 | 77.56 | 79.38 |
| 4C | Control | 74.95 | 76.52 | 77.92 | 78.32 |
| 4A | 1.8% Arginine 1.8% 4CT: 3.6% PA | 73.08 | 77.13 | 78.11 | 80.46 |
| 4B | 1.8% 4CT; 1.8% PA | 67.72 | 74.95 | 76.76 | 76.95 |
| 5C | Control | 75.26 | 81.43 | 80.72 | 82.45 |
| 5A | 0.9% 4CT; 0.9% PA | 63.32 | 70.07 | 74.51 | 75.64 |
| 6C | Control | 84.38 | 82.77 | 83.33 | 84.23 |
| 6A | 2.7% CA; 2.7% PA | 76.21 | 82.98 | 83.80 | 85.25 |

*4CT is an abbreviation for 4-carboxyTEMPO; Mino. is an abbreviation for Minoxidil; L-Arg is an abbreviation for L-Arginine; PA is an abbreviation for palmitic anhydride; Irg is an abbreviation for Irganox ® 1010; and CA is an abbreviation for citric anhydride.

Example 2

The samples in Example 2 were prepared in the same manner as in Example 1, however the material cured with the masterbatch was a vinyltrimethoxysilane-vinyltriethyoxysilane-grafted HDPE.

TABLE 2

Gel times at different hour time points for various compositions with a silane-grafted HDPE.

| Sample No. | Masterbatch* | % Gel at 8 hours | % Gel at 12 hours | % Gel at 17 hours | % Gel at 24 hours |
|---|---|---|---|---|---|
| 7C | Control | 59.74 | 65.11 | 69.82 | 69.44 |
| 7A | 1.8% 4CT; 1.8% Arg; 3.6% PA | 61.19 | 64.31 | 65.95 | 70.93 |
| 7B | 1.8% 4CT; 1.8% PA | 53.54 | 63.77 | 67.65 | 69.11 |
| 8C | Control | 74.48 | 75.54 | 74.85 | 76.33 |
| 8A | 1.8% Melatonin 1.8% PA | 44.74 | 57.16 | 59.02 | 60.66 |
| 8B | 3.6% Melatonin | 21.37 | 43.57 | 45.90 | 48.53 |
| 8D | 1.8% Mino; 2.7% PA | 54.75 | 62.46 | 61.11 | 63.71 |
| 8E | 3.6% Mino | 45.41 | 54.19 | 53.45 | 52.65 |
| 8C | Control | 71.38 | 70.69 | 71.29 | 73.58 |
| 8A | 1.8% Borosilicate microspheres 1.8% PA | 19.94 | 28.03 | 31.11 | 24.33 |
| 8B | 1.8% Irg; 1.8% PA | 27.77 | 25.20 | 24.22 | 16.82 |
| 8D | 2.7% Irg; 0.9% PA | 20.71 | 20.66 | 27.03 | 23.45 |
| 9C | Control | 58.77 | 61.74 | 65.06 | 70.70 |
| 9A | 3.6% L-Arg; 3.6% PA | 38.85 | 46.47 | 52.18 | 57.82 |
| 9B | 3.6% Irg; 3.6% L-Arg | 8.46 | 10.00 | 18.57 | 13.80 |
| 9D | 5.4% Irg; 1.8% L-Arg | 9.41 | 17.65 | 14.89 | 18.84 |
| 9E | 5.4% L-Arg; 1.8% PA | 19.33 | 19.08 | 22.51 | 21.78 |
| 10C | Control | 64.15 | 66.90 | 66.50 | 67.50 |
| 10A | 1.8% Mino; 1.8% L-Arg; 3.6% PA | 56.20 | 63.10 | 66.60 | 68.00 |
| 10B | 2.7% CA; 2.7% PA | 64.90 | 68.40 | 68.50 | 71.20 |
| 11C | Control | 58.55 | 59.75 | 63.76 | 66.02 |
| 11A | 3.6% L-Arg; 3.6% PA; 1.8% Mino | 45.70 | 49.82 | 55.92 | 60.91 |
| 12C | Control | 58.97 | 62.75 | 64.66 | 65.19 |
| 12A | 3.6% 4CT: 3.6% PA | 60.84 | 65.68 | 70.44 | 70.92 |
| 12B | 1.8% 4CT; 5.4% PA | 62.99 | 66.58 | 69.15 | 70.99 |
| 13C | Control | 67.13 | 69.32 | 70.97 | 71.03 |
| 13A | 3.6% 4CT | 48.19 | 53.38 | 56.14 | 58.57 |
| 14C | Control | 67.20 | 70.62 | 73.81 | 83.36 |
| 14A | 0.9% 4CT 0.9% PA | 60.83 | 65.18 | 70.14 | 58.16 |
| 14B | 1.8% 4CT; 1.8% PA | 66.94 | 71.92 | 71.80 | 72.93 |
| 14C | Control | 53.24 | 52.12 | 57.61 | 65.56 |
| 14A | 1.8% 4CT; 2.7% PA | 47.57 | 46.32 | 53.19 | 61.92 |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, includes the number recited and refers to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising:
    a first anhydride-grafted polyethylene; and
    a cross-linking agent comprising:
        a first material selected from the group consisting of minoxidil; melatonin; pentaerythritol tetrakis(3-(3,5-di-tert-butyl-4-hydroxyphenyl)propionate); (2,2,6,6-tetramethylpiperidin-1-yl)oxyl; and a derivative of (2,2,6,6-tetramethylpiperidin-1-yl)oxyl; and
        a second anhydride selected from the group consisting of palmitic anhydride, caprylic anhydride, myristic anhydride, stearic anhydride, arachidic anhydride, capric anhydride, behenic anhydride, an alkyl or alkenyl succinic anhydride, lignoceric anhydride, cerotic anhydride, laurel anhydride, citric anhydride, acetic anhydride, lactic anhydride, and a mixture of any two or more thereof;
    wherein:
        the composition is a master batch devoid of any silane-grafted polyethylene material;
        the composition is tin-free; and
        the derivative of (2,2,6,6-tetramethylpiperidin-1-yl)oxyl (TEMPO) is selected from 4-acetamido-TEMPO; 4-acetamido-2,2,6,6-tetramethylpiperidine 1-oxyl; 4-amino-TEMPO; 2-azaadamantane-N-oxyl; 4-(2-bromoacetamido)-TEMPO; 4-carboxy-TEMPO; 4-cyano-TEMPO; 4-hydroxy-TEMPO; 4-hydroxy-TEMPO benzoate; 4-(2-iodoacetamido)-TEMPO; 4-isothiocyanato-TEMPO; 4-maleimido-TEMPO; 4-methoxy-TEMPO; 4-oxo-TEMPO; 4-phosphonooxy-TEMPO hydrate; and TEMPO methacrylate.

2. The composition of claim 1, wherein the first anhydride is maleic anhydride, succinic anhydride, or a combination thereof.

3. The composition of claim 1 further comprising silica or a zeolite.

4. The composition of claim 1, wherein the first material comprises minoxidil.

5. The composition of claim 1, wherein the first material comprises melatonin.

6. The composition of claim 1, wherein the first material comprises pentaerythritol tetrakis(3-(3,5-di-tert-butyl-4-hydroxyphenyl)propionate).

7. The composition of claim 1, wherein the first material comprises 4-carboxy-(2,2,6,6-tetramethylpiperidin-1-yl)oxyl.

8. The composition of claim 1 comprising from about 0.01 wt % to about 40 wt % of the first anhydride-grafted polyethylene.

9. The composition of claim 1 comprising from about 0.01 wt % to about 30 wt % of the second anhydride.

10. The composition of claim 1 comprising from about 0.01 wt % to about 30 wt % of the first material.

11. The composition of claim 1 further comprising one or more antioxidants.

12. The composition of claim 11, wherein the one or more antioxidants comprise Irganox® 1010 or Irgafos® 168.

13. A tin-free cross-linked polyethylene comprising:
    a silane-grafted polyethylene; and
    the composition of claim 1.

14. A process comprising:
    extruding a first anhydride-grafted polyethylene and a cross-linking agent to form a master batch;
    extruding a silane-grafted polyethylene with the master batch to form a cross-linkable blend;
    exposing the cross-linkable blend to water to form a cross-linked polyethylene;
    wherein the cross-linking agent comprises a second anhydride and a first material selected from the group consisting of minoxidil; melatonin; pentaerythritol tetrakis(3-(3,5-di-tert-butyl-4-hydroxyphenyl)propionate); (2,2,6,6-tetramethylpiperidin-1-yl)oxyl; and a derivative of (2,2,6,6-tetramethylpiperidin-1-yl)oxyl, and the cross-linked polyethylene is tin-free; and
    the derivative of (2,2,2,6,6-tetramethylpiperidin-1-yl)oxyl is selected from 4-acetamido-TEMPO; 4-acetamido-2,2,6,6-tetramethylpiperidine 1-oxyl; 4-amino-TEMPO; 2-azaadamantane-N-oxyl; 4-(2-bromoacetamido)-TEMPO; 4-carboxy-TEMPO; 4-cyano-TEMPO; 4-hydroxy-TEMPO; 4-hydroxy- TEMPO benzoate; 4-(2-iodoacetamido)-TEMPO; 4-isothiocyanato-TEMPO; 4-maleimido-TEMPO; 4-methoxy-TEMPO; 4-oxo-TEMPO; 4-phosphonooxy-TEMPO hydrate; and TEMPO methacrylate.

15. The process of claim 14, wherein the master batch comprises from about 0.01 wt % to about 10 wt % first anhydride-grafted polyethylene.

16. The process of claim 14, wherein the master batch comprises from about 0.01 wt % to about 10 wt % of the second anhydride.

17. The process of claim 14, wherein the first anhydride-grafted polyethylene is a maleic anhydride-grafted polyethylene or a succinic anhydride-grafted polyethylene.

\* \* \* \* \*

UNITED STATES PATENT AND TRADEMARK OFFICE
CERTIFICATE OF CORRECTION

PATENT NO. : 9,441,103 B2
APPLICATION NO. : 14/641750
DATED : September 13, 2016
INVENTOR(S) : Christopher Ross, David Roberts and Anne M. Lawson It is certified that error appears in the above-identified patent and that said Letters Patent is hereby corrected as shown below:

In the Claims

In Column 12, Line 1, Claim 1, change --laurel-- to lauryl

Signed and Sealed this
Twenty-first Day of February, 2017

Michelle K. Lee
*Director of the United States Patent and Trademark Office*